US009600587B2

(12) United States Patent
Epstein (10) Patent No.: US 9,600,587 B2
(45) Date of Patent: *Mar. 21, 2017

(54) METHODS AND APPARATUSES FOR GENERATING SEARCH EXPRESSIONS FROM CONTENT, FOR APPLYING SEARCH EXPRESSIONS TO CONTENT COLLECTIONS, AND/OR FOR ANALYZING CORRESPONDING SEARCH RESULTS

(71) Applicant: Zalag Corporation, Sammamish, WA (US)

(72) Inventor: Samuel S. Epstein, Sammamish, WA (US)

(73) Assignee: Zalag Corporation, Sammamish, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/930,491

(22) Filed: Nov. 2, 2015

(65) Prior Publication Data
US 2016/0070807 A1 Mar. 10, 2016

Related U.S. Application Data

(63) Continuation-in-part of application No. 13/276,778, filed on Oct. 19, 2011, now Pat. No. 9,208,218.

(51) Int. Cl.
G06F 17/30 (2006.01)
(52) U.S. Cl.
CPC .. *G06F 17/30867* (2013.01); *G06F 17/30392* (2013.01); *G06F 17/30654* (2013.01)
(58) Field of Classification Search
CPC ......... G06F 17/30867; G06F 17/30392; G06F 17/30654
(Continued)

(56) References Cited

U.S. PATENT DOCUMENTS 3,568,156 A 3/1971 Thompson
6,658,404 B1 12/2003 Cecchini
(Continued)

FOREIGN PATENT DOCUMENTS

KR 100913049 B1 8/2009

OTHER PUBLICATIONS

PCT International Search Report and Written Opinion for PCT/US2012/058795, mailed Jan. 30, 2013, 10 pages.
(Continued)

*Primary Examiner* — Rehana Perveen
*Assistant Examiner* — Tiffany Thuy Bui
(74) *Attorney, Agent, or Firm* — Schwabe, Williamson & Wyatt, P.C.

(57) ABSTRACT

Methods, storage media, and apparatuses associated with evaluating a content item are disclosed herein. In various embodiments, a computer-implemented method may include receiving, by a search expression generator operated by a computer, the content item. Additionally, the method may include generating a search expression, by the search expression generator, based on the content item, to facilitate evaluating the content item based at least in part on searching other content items using the search expression. The search expression may indicate nested juxtapositions of sub-expressions of the search expression. In other embodiments, at least one storage medium may include instructions implementing a search engine that applies the search expression to a collection of other content items. In still other embodiments, an apparatus may include a configurator adapted to organize the collection of other content items. Other embodiments may also be disclosed and claimed.

21 Claims, 3 Drawing Sheets

(58) Field of Classification Search
USPC .......................................................... 707/706
See application file for complete search history.

(56) References Cited

U.S. PATENT DOCUMENTS

| | | |
|---|---|---|
| 7,383,504 B1 | 6/2008 | Divakaran et al. |
| 2002/0126905 A1 | 9/2002 | Suzuki et al. |
| 2006/0010105 A1 | 1/2006 | Sarukkai |
| 2006/0074903 A1 | 4/2006 | Meyerzon et al. |
| 2006/0195427 A1 | 8/2006 | Kilroy |
| 2007/0022099 A1 | 1/2007 | Yoshimura et al. |
| 2007/0061384 A1 | 3/2007 | Harrington et al. |
| 2007/0288438 A1 | 12/2007 | Epstein |
| 2008/0033938 A1 | 2/2008 | Okamoto et al. |
| 2008/0065685 A1 | 3/2008 | Frank |
| 2008/0235187 A1 | 9/2008 | Gade et al. |
| 2009/0012946 A1 | 1/2009 | Tsunokawa |
| 2009/0119258 A1 | 5/2009 | Petty |
| 2010/0250547 A1 | 9/2010 | Grefenstette et al. |
| 2013/0103662 A1 | 4/2013 | Epstein |

OTHER PUBLICATIONS

Non-Final Office Action mailed Jul. 2, 2013 for U.S. Appl. No. 13/726,778, 23 pages.
Non-Final Office Action mailed Dec. 31, 2013 for U.S. Appl. No. 13/726,778, 31 pages.
Final Office Action mailed Jul. 9, 2014 for U.S. Appl. No. 13/726,778, 26 pages.
Non-Final Office Action mailed Mar. 4, 2015 for U.S. Appl. No. 13/726,778, 23 pages.

METHODS AND APPARATUSES FOR GENERATING SEARCH EXPRESSIONS FROM CONTENT, FOR APPLYING SEARCH EXPRESSIONS TO CONTENT COLLECTIONS, AND/OR FOR ANALYZING CORRESPONDING SEARCH RESULTS

RELATED APPLICATION

This application is a continuation-in-part application of U.S. patent application Ser. No. 13/276,778, entitled "METHODS AND APPARATUSES FOR GENERATING SEARCH EXPRESSIONS FROM CONTENT, FOR APPLYING SEARCH EXPRESSIONS TO CONTENT COLLECTIONS, AND/OR FOR ANALYZING CORRESPONDING SEARCH RESULTS," filed on Oct. 19, 2011, and claims priority to the Ser. No. 13/276,778 application. The Specification of application Ser. No. 13/276,778 is hereby fully incorporated by reference.

FIELD OF THE INVENTION

Embodiments of the present invention relate to the field of data processing, in particular, to methods and apparatuses for generating search expressions from content items, for applying search expressions to content collections to generate search results, and for analyzing the search results.

BACKGROUND

Data mining technology may support knowledge discovery in databases. Information retrieval technology, such as latent semantic indexing and concept indexing, may support knowledge discovery in collections of electronic documents. Search-by-example systems may apply searches that correspond to content instances, but these systems generally are insensitive to content interrelationships. Predictive analytic technology may support predictions of the effects of content publication. Natural language understanding technology, including relation extraction technology, may support deductive and inductive reasoning based on the contents of electronic texts. Taken separately or together, these technologies are unable to fully exploit the potential for automatic knowledge discovery in collections of electronic content and are unable to fully exploit the potential for analyzing the probable effects of content publication from data about the effects of previous content publications.

DETAILED DESCRIPTION OF EMBODIMENTS OF THE INVENTION

Embodiments of the present invention may include, but are not limited to, generation of search expressions from pre-publication content items, automated discovery of knowledge in collections of published content items, and/or prediction of publication effectiveness of the pre-publication content items.

I. Generation of Search Expressions from Content Items

Embodiments of the present invention may include a search expression generator (e.g., generator 102 of FIG. 1) configured to generate search expressions from content items, e.g., pre-publication content items. Content items may include texts, and the search expressions may include juxtaposition operators. Various embodiments iteratively and incrementally construct the search expressions. Construction of search expressions may incorporate parenthesization to indicate the order of application of instances of the juxtaposition operator. Proximity within content items is one realization of juxtaposition, and is an indicator of semantic relatedness. For some of these embodiments, the search expressions may be constructed with parentheses and the ## proximity operator. The ## proximity operator may specify a proximity relationship between two sub-expressions. ## may be scalar valued. For further description of the ## proximity operator, refer to U.S. Pat. No. 7,987,169. Hereafter, a "recursively parenthesized search expression" is a search expression that includes at least one instance of parenthesization, where some sub-expression lies outside the scope of that instance of parenthesization. "Parenthesization" as used herein, is used in an abstract sense, independently of any particular formalism. For example, parenthesization may be represented using Polish notation. In a recursively parenthesized search expression, instances of a juxtaposition operator may be explicit or implicit. Hereafter, a "search expression with nested juxtaposition" is a recursively parenthesized search expression where a juxtaposition operator applies to the constituents of the root search expression and to the constituents of each non-terminal sub-expression. The juxtaposition operator may or may not be of fixed arity.

According to various embodiments, a search sub-expression may include one or more search expression terminals. Search expression terminals may be words (such as "dog"), or phrases (such as "friendly dog"), or word classes that contain words related through regular morphological patterns (such as {"dog", "dogs"}), or classes of words related through morphological similarity more generally (such as {"dog", "dogs", "doggish", . . . }), or classes of words related through synonymy (such as {"dog", "pooch", . . . }) and/or morphological similarity, or classes of words annotated with parts of speech (such as ({"dog", . . . }, noun)), or syntactic patterns filled by words, phrases, or word classes (such as the subject-verb-object pattern with the subject slot filled by a class represented by "man," with the verb slot filled by a class represented by "bite," and with the object slot filled by a class represented by "dog"), or word patterns defined according to sequence order (such as "'dog" to the left of "cat'"), or word patterns defined according to specified proximity relations (such as "'dog" within three words of "cat'"). Various embodiments may identify and represent classes and/or patterns according to various methods of prior art (for example, the methods of relation extraction). In the description to follow, for ease of understanding, search expression terminals may also be referred to as atomic search expressions. Unless the context clearly indicates otherwise, the two phrases may be considered synonymous.

According to alternative embodiments, search expression terminals may be variants of one or more of the possibilities enumerated earlier. Various prior art methods may be employed to assign words to classes. Various prior art methods may be employed to detect instances of syntactic patterns or other word patterns in texts.

Embodiments of the present disclosure may include a search engine (e.g., engine 110 of FIG. 1) configured to apply the search expressions to collection or collections of other content items, e.g., prior published content items, to enable identification of content items within the collections that are relevant to the content items, based on which the search expressions were generated. Various embodiments may accommodate words or word sequences in texts as imperfect matches to search expression terminals. For example, "pooch" might be considered as an imperfect match for "dog," or "the cat saw the friendly dog" might be considered as an imperfect match for "'cat' to the left of 'dog' with no more than one intervening word.' Various methods may be employed to assign scores to imperfect matches of search expression terminals. In particular, various embodiments may incorporate variants of the methods of U.S. Pat. No. 7,987,169, Paragraphs 38-39, e.g., as follows: first, imperfect match scores may be normalized as positive real numbers less than 1, then in place of the formula $\Sigma_{1\le i\le k}(1/(1+d_i)^x)$ in Paragraph 38 (yielding the r-value of a word W in text S, where k is the number of perfect or imperfect matches for a given search expression terminal E in a given text, where x (the "distance attenuation exponent") is a positive real number, and where $d_i$ is the distance between W and the i-th occurrence of $\Sigma_{1\le i\le k}(\epsilon_i/(1+d_i)^x)$ is used instead, where $0<\epsilon_i\le 1$ is the score assigned to the i-th perfect or imperfect match for E. Various embodiments may similarly adjust final search scores according to scores assigned to imperfect matches to search expression terminals.

Embodiments of the method of Paragraph 10, when dealing with imperfect matches, may assign varying weights to different search expression terminals. For example, because "beagle" occurs more rarely than "dog," a literal match of "beagle" may be considered more significant than a literal match of "dog." Thus a literal match of "beagle" might be assigned a weight of 0.89, while a literal match of "dog" might be assigned a weight of 0.27. Moreover, according to the method of Paragraph 10 above, "dog" might be assigned a score of 0.08 as an approximate match for "beagle." Numeric scores in the preceding two sentences are illustrative only. Various embodiments may maintain annotated word and phrase lists with scores for approximate matches, weights for literal matches, and formulas for deriving other weights and scores. For an example of a formula for deriving weights, suppose that data is available that numerically indicates the relative rarity of words. Then words may be assigned weights corresponding to a constant times relative rarity, so that the rarest words are assigned a weight of 1.0, and so that the most common words are assigned scores much closer to 0.0 than to 0.1. For an example of a formula for deriving scores for approximate matches, suppose that data is available that indicates the relative rarity of words, and data is also available indicating which words participate in entailment relations with which other words. Because "is-a-beagle" entails "is-a-dog," the score for "dog" as a match for "beagle" can be a constant times the ratio of the relative rarity of "beagle" with the relative rarity of "dog."

Taking words as representative examples of search expression terminals, an example of a search expression may be dog o ((cat o food) o kitchen)

where o is a juxtaposition operator.

Figure 2:
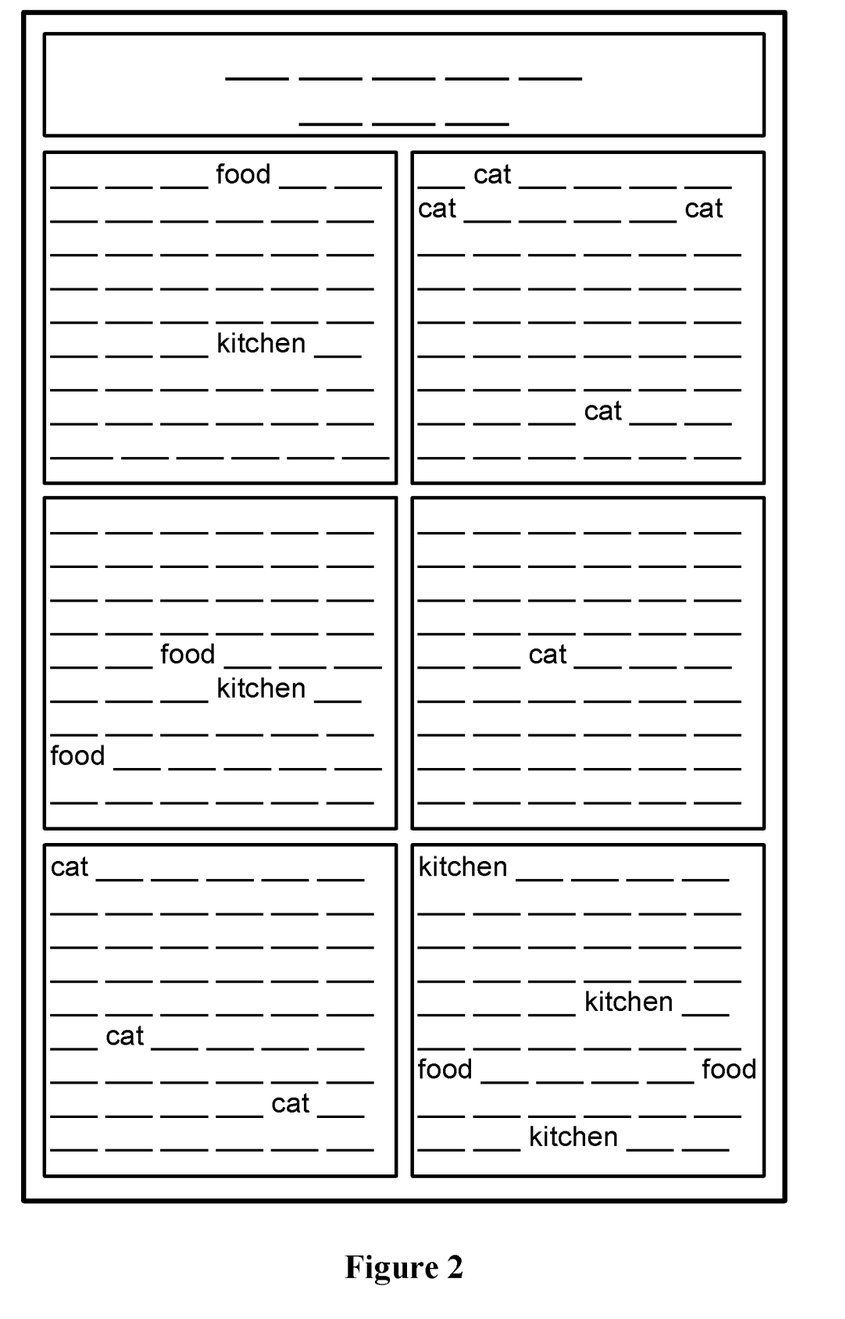
FIG. 2 illustrates an example non-associative juxtaposition operator reflecting contrasting content configurations, in accordance with various embodiments.

FIG. 2 illustrates an example non-associative juxtaposition operator reflecting contrasting content configurations, in accordance with various embodiments. The content in FIG. 2 comprises a heading and six paragraphs. "__________" indicates any word other than "cat," "food," or "kitchen." The content in FIG. 2 may be considered a better match for cat o (food o kitchen)

than for (cat o food) o kitchen where o is a non-associative juxtaposition operator.

Embodiments of the present disclosure may include a search expression generator (e.g., generator 102 of FIG. 1) configured to begin the transformation of a text to a search expression by deleting specified words and phrases from the text. For example, very common words and phrases (such as "the" for English texts) may be deleted. For another example, words and phrases that aren't specific to subject matter (such as "for example" for English texts) may be deleted. Words and phrases to be deleted may be stored in an online dictionary.

Various embodiments may then proceed by dividing a given text into subtexts, where subtext boundaries correspond to punctuation marks separating phrases, such as commas, punctuation marks separating sentences, such as periods, paired punctuation marks, such as quotation marks and parentheses, starts and ends of text runs in distinctive fonts, phrases separated by connectives such as "and," paragraph starts and ends, chapter starts and ends, and so on. Different boundary markers correspond to different hierarchical levels of containing subtext. For example, chapters contain paragraphs, and paragraphs contain sentences. Once a given text is divided into subtexts, where subtexts may comprise sequences of other subtexts, all boundary markers may be replaced by parenthesis pairs, so that the levels of parenthesization correspond to levels in the subtext hierarchy.

Various embodiments may then apply methods noted in Paragraph 8 to subtexts within innermost parentheses. These applications transform subtexts from sequences of words to sequences of classes, or to sequences of patterns.

In various embodiments, the transformation from text to search expression may further include insertion of instances of a juxtaposition operator between sequence elements, and between sibling parenthesized expressions within the parenthesization hierarchy.

In alternative embodiments, all or some of the transformations of Paragraph 8 may take place before the division of Paragraph 15. This permits recognition of phrases and patterns that cross indicated boundaries. For example, "the dog, who seldom barks, saw the cat" includes an instance of the subject-verb-object pattern where the subject is separated from the verb and object by an instance of the subject-verb pattern. In cases like this where two patterns cross, various embodiments place the pattern that begins first ahead of the other pattern in sequence.

The following is an example of a commercial post to a social networking site:

In a test of the 2011 Mavic R-Sys SLR Wheel-Tyre System, the UK cycling magazine Cycling Plus awarded Editor's Choice to the Mavic R-Sys. "These are among the lightest and smoothest wheels we've ever tested, with hard, out-of-the-saddle sprints, big lean angles in corners, and rough roads and cobbles all handled with the minimum of fuss," wrote the reviewers.

Applying operations described in Paragraph 14 can yield:
test 2011 Mavic R-Sys SLR Wheel-Tyre System, UK cycling magazine Cycling Plus awarded Editor's Choice Mavic R-Sys. "lightest smoothest wheels tested, hard, out-of-the-saddle sprints, big lean angles corners, rough roads cobbles handled minimum fuss," wrote reviewers.

Applying operations described in Paragraph 15 can then yield:
((test 2011 Mavic "R-Sys" SLR "Wheel-Tyre" System) (UK cycling magazine Cycling Plus awarded Editor's Choice Mavic "R-Sys")) ((((lightest smoothest wheels tested) hard ("out-of-the-saddle" sprints) (big lean angles corners) (rough roads cobbles handled minimum fuss)) wrote reviewers)

Applying operations described in Paragraph 17 can then yield the search expression:
((test o 2011 o Mavic o "R-Sys" o SLR o "Wheel-Tyre" o System) o (UK o cycling o magazine o Cycling o Plus o awarded o Editor's o Choice o Mavic o "R-Sys")) o (((lightest o smoothest o wheels o tested) o hard o ("out-of-the-saddle" o sprints) o (big o lean o angles o corners) o (rough o roads o cobbles o handled o minimum o fuss)) o wrote o reviewers)
where o is a juxtaposition operator.

Applying alternative methods at the various stages may yield different results. For example, if "and" is taken as a boundary marker, rather than as a common word to be deleted, the operations described in Paragraph 14 and Paragraph 15 might yield:
((test 2011 Mavic "R-Sys" SLR "Wheel-Tyre" System) (UK cycling magazine Cycling Plus awarded Editor's Choice Mavic "R-Sys")) ((((lightest) (smoothest wheels tested)) hard ("out-of-the-saddle" sprints) (big lean angles corners) (((rough roads) (cobbles handled minimum fuss)))) wrote reviewers)

Incorporating a more sophisticated understanding of English coordination might yield instead:
((test 2011 Mavic "R-Sys" SLR "Wheel-Tyre" System) UK cycling magazine Cycling Plus awarded Editor's Choice Mavic "R-Sys") ((((lightest smoothest) wheels tested) ((hard ("out-of-the-saddle" sprints)) (big lean angles corners) (rough (roads cobbles)) handled minimum fuss)) wrote reviewers)

Additionally incorporating knowledge of noun compounds might yield:
((test (2011 (Mavic ("R-Sys" SLR ("Wheel-Tyre" System))))) UK (cycling magazine) (Cycling Plus) awarded (Editor's Choice) (Mavic "R-Sys")) ((((lightest smoothest) wheels tested) ((hard ("out-of-the-saddle" sprints)) (big lean angles corners) (rough (roads cobbles)) handled minimum fuss)) wrote reviewers)

Many alternative transformations of this example are possible under the embodiments of this disclosure. For example, as noted in Paragraph 8, prior art methods may be employed to replace individual words with word classes.

In addition to commercial posts to social network sites, embodiments of the present disclosure apply to non-commercial posts to social network sites, to blog posts, to bulletin board posts, and to other collections of short electronic texts. Embodiments of the present disclosure also apply to collections of longer electronic texts, such as case law databases, and to electronic documents more generally. And embodiments of the present disclosure also apply to more highly configured content, such as Web pages. For highly configured content, the hierarchy of parenthesized sub-expressions in generated search expressions reflects a containment hierarchy of content items. According to various embodiments, the set of words and phrases to be deleted, as described in Paragraph 14, becomes larger for content with greater total amounts of text. Some of these embodiments may use a dictionary of words and phrases to be retained (keywords), rather than a dictionary of words and phrases to be deleted.

In various embodiments, logical connectives may not be preserved, when generating search expressions from texts, either working from literal texts or from logical analyses of texts' meanings. A search expression such as
"dog AND NOT cat"
is a request for content where "dog" appears and "cat" does not appear, and
"the dog didn't bite the cat"
for example, does not correspond to this search expression. In alternate embodiments, logical operators may be preserved. For various ones of these embodiments, search expressions may be normalized by moving negative operators inward prior to calculating scores.

Prior art search-by-example systems apply searches that correspond to content instances, but these systems do not reflect content interrelationships.

II. Supplementary Configuration of Content Collections

Hereafter, "content collection" may refer to a database with textual content items, to two or more associated databases with textual content items, to one or more associated views derived from such databases, to a repository of documents associated with one or more databases or database views, or to a repository of documents not associated with any database or database view. A single document may count as instance of a "content collection," and similarly for a single database object/record. As used herein, the term "document" is a specie of "content item." Embodiments of the present disclosure may include a content item configurator (e.g., configurator 108 of FIG. 1), configured to compute configuration-related data for content collections. In particular, embodiments may use prior art methods of information retrieval to organize document collections into directed acyclic graphs of sub-collections, and use prior art methods of data mining to organize content collections into directed acyclic graphs of database objects/records. Within these directed acyclic graphs, content collections assigned to parent nodes contain as subsets the collections assign to their child nodes. Moreover, various embodiments may use various prior art methods to assign attributes to directed acyclic graph nodes. Embodiments of the search engine may use the methods of U.S. Pat. No. 7,987,169 to establish "relevance geometries" on directed acyclic graphs of content collections, establishing "relevance sizes" for directed acyclic graph nodes, and establishing "relevance distances" between pairs of nodes.

For example, consider a database of commercial posts to a social media Web site. The database may include the posts themselves, and also information about the posts, such as dates and times, numbers and types of reactions from readers, and so on. Posts may be configured as a directed acylic graph comprising two trees. In both trees, terminal nodes correspond to individual posts, and each parent of terminal nodes_corresponds to the set of posts promoting a particular product. The first tree categorizes and sub-categorizes products by function and construction. The "clothing" node dominates the "headgear" node dominates the "billed cap" node, and so on. Many products may be themed with cartoon characters. Every product may have a target demographic. The second tree categorizes and sub-categorizes products by theme and target demographic. The "three-yearold to eighteen-year-old" node dominates the "three-year-old to eleven-year-old" node dominates the "cartoon animal character" node dominates the "Celeste Bluebird" node, and so on. The "Celeste Bluebird billed cap" node is the child of the "billed cap" node in the first tree, and is the child of the "Celeste Bluebird" node in the second tree. The above trees are illustrative, and not to be construed as limiting on the present disclosure; many variants of this organization into a directed acyclic graph are possible.

According to some embodiments of this disclosure, the search engine may determine relevance distance by criteria similar to the criteria that determine the organization of content collections into a tree. For some of these embodiments, different determinations of relevance distance among sibling nodes may apply according to different trees within a directed acyclic graph. For example, in the first tree of the example of Paragraph 26, the relevance distance between two "billed caps" under the "Celeste Bluebird billed caps" node might be a function of the relative lengths of their bills. In the second tree, the relevance distance between two "Celeste Bluebird billed caps" might be a function of how the caps' depictions of Celeste Bluebird are posed (full body side view, head front view, . . . ).

In alternative embodiments, relevance distance for one tree may be determined by criteria similar to the criteria that determine the organization of another tree. In other alternative embodiments, relevance distance for a tree may be determined by criteria different from any of the criteria that determine the organization of trees in the directed acyclic graph.

Continuing the example based on a database of commercial posts to a social media Web site, the relevance size of a set of posts might be a function of the number of posts in the set, the average monthly sales in dollars of the products featured in the posts in the set, and/or the average number of positive reader reactions to posts in the set.

Further continuing this example, suppose that a candidate post is to be assessed for answers to the following three questions: What is the expected reception of this post? When is the best time to issue this post (e.g., best day of the week, best time of the day)? Which parts of the post, if any, should be rewritten to improve the expected reception of the post?

To help answer the first question, the search expression corresponding to the candidate post may be applied to a directed acylic graph as sketched above, e.g., by a search engine, according to the search methods of U.S. Pat. No. 7,987,169, or according to other search methods. The highest scoring sets of prior posts, possibly restricted according to a minimum threshold score, may be weighted according to search score and assessed according to available data on reader reactions. Sets of posts may also be weighted according to cardinality, and according to hierarchical position in the various trees of the directed acyclic graph. For example, posts lower in hierarchies may be considered to provide more accurate prediction. Moreover, predictions based on search scores, and thus based on the content of the candidate post, may be balanced against predictions determined by other means.

Figure 1:
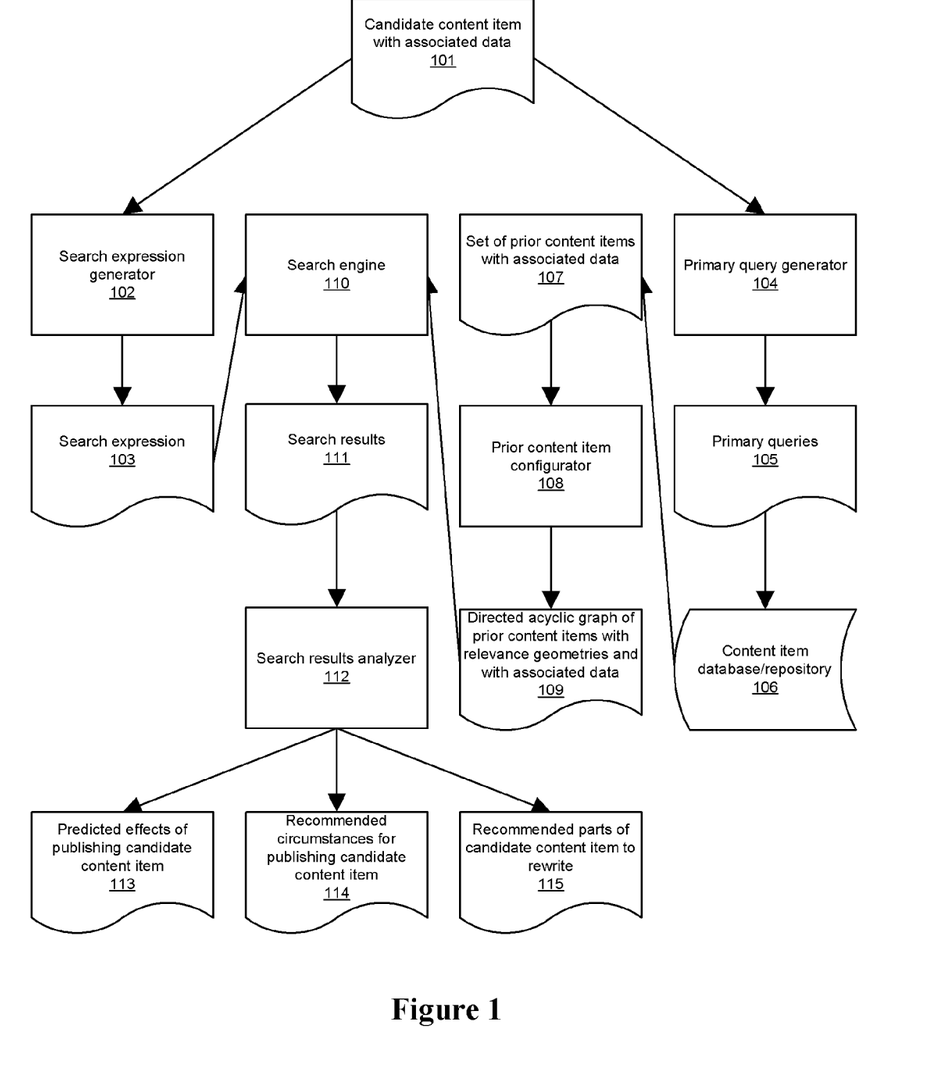
FIG. 1 illustrates an overview of the search expression generation, search, and analysis methods and apparatuses of the current disclosure, in accordance with various embodiments.

To help answer the second question, on optimal timing, the search expression corresponding to the candidate post may be applied as in Paragraph 31, with results weighted according to search scores. Such weighted results may then be assessed by e.g., a search result analyzer (such as, analyzer 112), according to available data on how timing (e.g., day of the week, time of the day) correlates with reader reactions. Recommended timings derived from these assessments may be balanced against recommendations determined by other means. Alternatively, prior posts may be organized into a tree or directed acyclic graph based on timings. For example, prior posts may be organized into a tree based on time of day, and into a second tree based on day of week. The search expression based on the candidate post may be applied to such timing-based tree or trees, with the best scoring timings deemed to be recommended timings. These timing recommendations may be balanced against recommendations determined by other means.

Given the search expression that corresponds to the candidate post, sub-expressions of this search expression correspond to identifiable parts of the candidate post. To help answer the third question, on which parts of the post (if any) should be rewritten, a sub-expression of the search expression may be applied, e.g., by a search engine, to the directed acylic graph according to the search methods of U.S. Pat. No. 7,987,169 or according to other search algorithms. If a particular set of posts has a high search score for a particular sub-expression, and if that set of posts has negative characteristics, such as a high average incidence of negative reactions from readers, that may serve as an indication that the part of the post corresponding to the sub-expression may be problematic.

Various embodiments may configure content collections after a particular search expression is formulated, and before the search expression is applied. Some of these embodiments may form a sub-collection of a content collection according to the search expression and possibly other considerations, and then configure this sub-collection prior to applying the search expression to just that sub-collection.

Alternative embodiments may configure content collections independently of any particular search expressions. Some of these embodiments may store the results of configuration so that these results are available when search expressions are applied. For example, configuration results for a database may be stored in the database itself, with the database scheme modified to accommodate configuration-related data. Various embodiments may use prior art methods, such as cluster analysis, to generate configuration-related data. Various embodiments may use prior art methods to dynamically maintain configurations as content collections are updated. Various embodiments may complement search-expression-independent configuration-related data with configuration-related data that is calculated after a search expression is generated.

III. Application of Search Expressions to Content Collections

A. Partial Matches

A candidate text for publication may contain one or more words that are not found in a given content collection. For example, a proper name within a candidate text might not occur within the content collection. In embodiments, the candidate text might nevertheless be considered to match the content collection.

In some cases, a content collection might be an apparently closer match for a candidate text than a second content collection, even though all the words of the candidate text occur in the second content collection, but not in the first content collection.

To accommodate these and similar situations, embodiments of the search engine may assign positive search scores to content collections that do not match all the search expression terminals within a search expression, either literally or approximately. For a given search expression E, these embodiments may calculate partial-match scores for E as distinguished from full-match scores for E, where the partial-match score for E is a function of the full-match scores of the sub-expressions of E. Some embodiments may assign positive partial-match scores even in cases where there's a positive full-match score.

According to various embodiments, given a content item N and given a search expression E constructed from search expression terminals with a juxtaposition operator and parenthesization, the partial-match score of N for E is a function of the full-match scores of the sub-expressions of E, with weight assigned to the full-match score of a sub-expression E' of E according to the hierarchical level of E' in a parse tree of E. (Parse trees for search expressions may be derived from the simple grammar of E→C, E→E o (C), E→(C) o E, E→e, where e is any atomic search expression, C→E o E, C→E o E o E, C→E o E o E o E, . . . C corresponds to a search expression that directly includes at least one occurrence of the juxtaposition operator o. As a final step, parsing may rewrite occurrences of C as E.) In one set of embodiments, for each hierarchical level of the parse tree of E, the relevance scores of the sub-expressions may be summed, and the sum may then divided by the number of sub-expressions at that hierarchical level, yielding $\rho_k$, the average relevance score of the sub-expressions at level k, where the root node of E is at level 0, the children of the root node are at level 1, and so on. Then the partial-match score of E for N may be calculated as a weighted average of the $\rho_k$. Weighting the average of the $\rho_k$ according to level assigns relative significance of partial matches based on how much of E is matched. For example, some of these embodiments may calculate partial match score as $\Sigma_{1 \leq k \leq L}(\rho_k*(k+c)^e)$, where L+1 is the number of hierarchical levels in the parse tree of normalized E, where c>0, and where e<0. According to alternative embodiments, the partial-match score of N for E is a function of the full-match scores of the sub-expressions of E, where the full-match scores of sub-expressions are not weighted according to hierarchical levels.

According to some embodiments, if a content collection has a positive full-match score for search expression E, then the content collection may receive a partial-match score of 0 for E. More generally, according to some embodiments, if a content collection has a positive full-match score for a sub-expression E' of E, then full-match scores of sub-expressions of E' may be excluded in the calculation of the partial-match score of E. According to alternative embodiments, a content collection may receive both a positive full-match score and a positive partial-match score. These alternative embodiments may distinguish cases where N matches E poorly but matches some sub-expressions of E well, from cases where N matches E poorly and matches all sub-expressions of E poorly. For some of these alternative embodiments, the partial-match score and the full-match score may be combined according to the methods of Paragraph 145 of U.S. Patent Publication 2009-0254549, where both partial-match score and full-match score are "beneficial" properties. For others of these alternative embodiments, the root node of E may be treated similarly to other nodes in the parse tree of E when calculating partial match scores. For example, according to some of these alternative embodiments, the formula of Paragraph 39 may be modified to $\Sigma_{0 \leq k \leq L}(\rho_k*(k+c)^e)$, so that the sum includes the full match score.

B. Content Collections as Search Results

Embodiments of the search engine may assign search scores to content collections within directed acyclic graphs of content collections, where the parent-child relationship in directed acyclic graphs corresponds to the superset-subset relationship. Proximity between content collections is one realization of juxtaposition, and is an indicator of semantic relatedness. Various embodiments may use methods that establish measures of proximity between content collections. Given proximity measurements between content collections, various embodiments may use search methods that are sensitive to these proximity measurements. Various embodiments may use search methods for which the proximity operator is non-associative. Among these embodiments, various embodiments may incorporate the search methods and apparatuses of U.S. Pat. No. 7,987,169, and U.S. Patent Publication 2009-0254549.

IV. Analysis of Search Results

Embodiments of the analyzer may apply prior art methods of predictive analytics, and of statistical analysis more generally, to content collections that receive positive search scores. Various embodiments may include search scores among the parameters that determine the level of confidence associated with analysis. Higher search scores may indicate closer correspondence to the search expression, and thus may indicate greater similarity to the candidate text. Various embodiments may apply analytics only to content collections whose search scores are greater than a fixed threshold score. Various other embodiments may apply analytics only to content collections whose search scores are greater than a constant times the maximum search score obtained for any content collection. Various other embodiments may use multiple parameters to determine which content collections receive application of which analytics.

V. Modules: Inputs and Outputs

Referring now to FIG. 1, wherein a block diagram illustrating an overview of an arrangement configured to practice the search and analysis methods, in accordance with various embodiments, is shown. As illustrated, for the embodiments, the text included within a content item 101 may be directed to search expression generator 102, incorporated with the teachings of the present disclosure, which may, in response, produce a search expression 103, as earlier described. The text included within content item 101, together with data associated with content item 101, may also be directed to primary query generator 104, which may, in response, produce a primary query 105, also as earlier described. Primary query 105 may be generated according to the content retrieval functionality associated with content item database or repository 106. For example, if content item database or repository 106 is an SQL database, then primary query 105 is an SQL query. Primary query 105 may be directed to content item database or repository 106, which may, in response, produce a set of prior content items with associated data 107, where the associated data may include configuration-related data stored in content item database or repository 106. Set of prior content items with associated data 107 may be directed to prior content item configurator 108, incorporated with the teachings of the present disclosure. Prior content item configurator 108, or a module incorporating similar methods, may also be applied independently of any search expressions, with results stored in content item database or repository 106. Prior content item configurator 108 may, in response, produce a directed acyclic graph (which may be a simple tree) 109 of prior content items, possibly with relevance geometries as described in U.S. Pat. No. 7,987,169, and possibly with associated data. Search expression 103, and directed acyclic graph 109 of prior content items with relevance geometries and with associated data, may then be directed to search engine 110. Search engine 110 may, in response, produce search results 111, comprising scores assigned to nodes of directed acylic graph 109. These scores may indicate which sets of prior content items correspond most closely to search expression 103, and thus to candidate content item 101. Search results analyzer 112 may analyze these sets of prior content items, with both scores assigned to directed acyclic graph nodes and data associated with content items as inputs, and may, in response, produce, among other possible outputs, predicted effects 113 of publishing candidate content item 101, recommended circumstances 114 for publishing candidate content item 101, and recommended parts 115 of candidate content item 101 to rewrite.

VI. Illustration of Non-Associative Juxtaposition Operator

FIG. 2 illustrates an example non-associative juxtaposition operator reflecting contrasting content configurations. The content in FIG. 2 comprises a heading and six paragraphs. "———" indicates any word other than "cat," "food," or "kitchen." The content in FIG. 2 is a better match for cat o (food o kitchen)

than for (cat o food) o kitchen where o is a non-associative juxtaposition operator.

VII. Generation of Search Expressions from Additional Categories of Content

According to various embodiments of the present disclosure, methods of the previous paragraphs may apply to generate search expressions from additional categories of content item, including but not limited to product descriptions, entertainment descriptions, and advertisements. These and other content items may be in the form of database records, in the form of HTML, XML, or other markup constituents, or in other forms that include associated texts. For example, a product description may be in the form of a database record that includes a text field that characterizes the product, or may be in the form of a markup constituent that includes text that characterizes the product. For another example, an entertainment description, such as a description of a film or a song, may be in the form of a database record that includes a text field that characterizes the entertainment, or may be in form of an HTML constituent that includes text that reviews the entertainment. For another example, an advertisement may be in the form of a database record that includes a text field that characterizes the product advertised.

According to various embodiments, search expressions generated from content in one or more categories may be applied to content in the same or different categories. For example, a search expression generated from a product description may be applied to a collection of product descriptions or to a collection of advertisements.

VII. Generation of Search Expressions from Content Item Constituents and from Content Collections According to various embodiments of the present disclosure, methods of previous paragraphs may apply to constituents of content items. For example, given a news article, methods of the previous paragraphs may generate a search expression from a paragraph of the news article.

Further, according to various embodiments, methods of previous paragraphs may apply to collections of content items and/or content item constituents. When such a content collection is organized hierarchically, with content collections as parents of content items, content item constituents, and/or other content collections, the search expression corresponding to a parent content collection may be the juxtaposition of the search expressions corresponding to the children of the parent For example, given a hierarchy of clusters of products that has been established according to prior art clustering methods, and given that each product has a text product description, the search expression corresponding to a parent cluster may be the juxtaposition of the search expressions corresponding to the children of the parent cluster.

Content items and constituents of content items that do not comprise texts may have associated texts. For example, an HTML product description may include an image with a text assigned to the "alt" attribute. For another example, an advertisement description in a database may include as constituents various text fields. Various embodiments treat texts associated with constituents similarly to the way they treat text constituents. Thus if a simple product description comprises a title "Acme Garden Rake," a text description "This steel rake is sturdy and light," and an uncaptioned image with "gathering autumn leaves" assigned to its "alt" attribute, one possible search expression generated from the product description may be (acme o garden o rake) o (steel o rake o sturdy o light) o (gathering o autumn o leaves).

Various embodiments may assign weights to sub-expressions of the generated search expression according to the roles of the sub-expressions' corresponding source content. Thus in the example of the preceding paragraph, the sub-expression corresponding to the title (acme o garden o rake) may be assigned a greater weight than the sub-expression corresponding to the text description (steel o rake o sturdy o light), reflecting the presumed greater significance of the title. Search expressions where sub-expressions are assigned varying weights can be evaluated so that search scores for weighting of sub-expressions is reflected in search scores, as disclosed in U.S. application Ser. No. 14/105,034, entitled METHODS AND APPARATUSES FOR CONTENT PREPARATION AND/OR SELECTION, filed on Dec. 12, 2013, having common inventorship with the present application.

Content collections may contain large numbers of words, even after function words like "the" are deleted. Further, single large documents may contain large numbers of words. Hereafter, in accordance with common usage, "terms" are words, designated phrases, or designated classes of words and phrases, where members of the same class share the same root or share one or more other designated properties. Various embodiments filter terms from search expressions according to criteria based on term frequency within content from which the search expression may be generated and/or based on counts of documents that contain terms. For example, various embodiments use various term-frequency inverse-document-frequency weighting schemes of prior art to determine which words and phrases to filter.

Various embodiments may calculate term frequency for an instance of content from multiple content instances, and then apply formulas for aggregate term frequency that distinguish among the source content instances, where content instances may be content items, constituents of content items, or content collections. Various embodiments may calculate inverse document frequency for an instance of content from multiple content instances, and then apply formulas for aggregate inverse document frequency that distinguish among the source content instances. For example, consider a directed acyclic graph of clusters of news articles that has been established according to prior art clustering methods, and consider a news article within this directed acyclic graph that is contained within two parent clusters, each of which has a single parent cluster and a single grandparent cluster, where the two grandparent clusters are children of a common great-grandparent cluster. Furthermore, greater term frequencies within the news article itself and within its parent clusters may result in higher term-frequency-inverse-document-frequency scores ("tf-idf scores"), while greater numbers of news articles that contain the term within the news article's grandparent and great-grandparent clusters result in lower tf-idf scores. More specifically, as a representative elaboration of this example, the tf-idf score for a term and for this news article may be $(1+\log(t_1+0.5*t_2))*\log(1+0.5*N_3/d_3+(N_4-N_3)/(d_4-d_3))$, where $t_1$ is the number of occurrences the term in the news article, $t_2$ is the number of occurrences of the term in other news articles in the parent clusters, $N_3$ is the number of documents in the two grandparent clusters together, $N_4$ is the number of documents in the great-grandparent cluster, $d_3$ is the number of documents within the two grandparent clusters together that contain the term, and $d_4$ is is the number of documents within the great-grandparent cluster that contain the term.

Various embodiments may assign weights to words and phrases of generated search expressions according to criteria based on term frequency within content from which the search expression is generated and/or based on document frequency within other content.

A search expression generated from a content collection C may of course be applied to content collections that have varying amounts of content shared with C. For example, a search expression generated from C may be applied to a content collection that has nothing in common with C except the appearances of certain words.

IX. Input to Generation of Search Expressions from Direct User Inputs and/or User-Related Data that Distinguish Among Content Item Constituents and/or Among Content Sub-Collections For search expressions generated from content items, various embodiments of the present disclosure may assign weights to sub-expressions according to user inputs that distinguish among constituents of the content items. For example, suppose that a search expression is to be generated from a news article that a user is reading in a Web browser, and that the generated search expression is to be used to search for current news articles to be recommended to the user. According to various embodiments, the user can highlight one or more areas of the browser presentation of the news article, employing a user interface feature incorporated in the Web page that contains the news article, or a user interface feature incorporated in the browser. For some of these embodiments, the user interface feature may allow different levels of highlighting. Sub-expressions of the generated search expression that correspond to constituents of the news article that appear in highlighted areas may be assigned greater weights than constituents that do not appear in highlighted areas. Different levels of highlighting may correspond to differences among assigned weights.

For search expressions generated from content collections, various embodiments may assign weights to sub-expressions according to user inputs that distinguish among sub-collections of collections, elements of collections, and constituents of elements of collections. For example, according to various embodiments, during a session on a shopping Web site, the user can indicate products of interest by checking provided check boxes on product pages, or by indicating levels of interest with sliders provided on product pages, or similar. Sub-expressions of the generated search expression may be weighted so that sub-expressions that correspond to checked products may be assigned greater weights than sub-expressions that do not correspond to checked products. For user interfaces that accommodate indication of degree of interest, as with sliders, different levels of indicated interest may correspond to differences among assigned weights.

Various embodiments of the present disclosure may assign weights to sub-expressions of generated search expressions according to user-related data. For example, suppose that users of a Web site are assigned to user clusters according to provided or inferred properties such as age and occupation. Suppose further that the site displays advertisements to a particular user based on searching for advertisements with search expressions generated from pages visited by the user. According to various embodiments, given a sub-expression of a generated search expression that corresponds to a particular visited page, the weight assigned to the sub-expression can correspond to the relative frequency of visits to the page by members of the user's assigned cluster.

Given a sub-expression of a search expression that corresponds to a distinguished content item constituent or content sub-collection, various embodiments may move and/or copy the sub-expression within the search expression. Some of these embodiments may move and/or copy sub-expressions instead of assigning weights to sub-expressions. Other embodiments may move and/or copy sub-expressions in addition to assigning weights to sub-expressions. As an example of copying a sub-expression, consider a news article where a user has highlighted one paragraph. Suppose that E is the full search expression for the news article that would be generated if no constituent of the news article is distinguished based on user inputs or user-related data. Suppose that E' is the sub-expression of E that corresponds to the highlighted paragraph. Then E o E' may be an example of a search expression that results from copying E', reflecting the significance of the highlighted paragraph.

X. Generated Search Expressions as Input to Document Recommendation, Sub-Document Recommendation, Document Collection Recommendation, Product Recommendation, Entertainment Recommendation, and Advertisement Recommendation Various embodiments of the present disclosure may use the results of searches with generated search expressions to generate recommendations. The objects of generated recommendations may include but are not limited to documents such as news articles, Wikipedia articles, and Web pages, sub-documents such as paragraphs within news articles, document collections such as the works in a bibliography, product recommendations such as one or more brief product presentations on a retailer Web page that presents another product in detail, entertainment recommendations such as descriptive links that lead directly or indirectly to sound or video files, and advertisements. Intended audiences for generated recommendations may include but are not limited to single users, sets of users, and automated systems such as advertising servers. The forms in which generated recommendations are provided may include but are not limited to Web links, excerpts from recommended content, descriptions of recommended content, and instructions to automated systems to present content. Embodiments of the present disclosure may generate recommendations in conjunction with various prior art technologies.

For example, suppose that a user has read two news articles during a reading session and is reading a third article. A search expression with nested juxtaposition sub-expressions may be generated according to methods of previous paragraphs and applied to a collection of news articles that have been published during a specified time window. The news articles that score highest in the search may then be presented to the user in the form of a list of descriptive links that appear on the Web page that includes the news article that the user is reading. In a variant of this example, the generated search expression may be applied to a collection of advertisements paired with accompanying descriptions, and the advertisement that scores highest may then be presented to the user on the Web page that includes the news article that the user is reading.

According to various embodiments, recommendation generation may iteratively invoke a search expression generation step followed by a search step. In a variant of the example of the preceding paragraph, the search expression generated from three news articles may be applied to a collection of news articles associated with a time window extending back for months or years. The collection corresponding to the top results of this first generate-and-search iteration may then be used to generate a search expression which is then applied to a collection of news articles associated with a time window extending back for minutes or hours. The news articles that score highest in this second search may then be presented to the user in the form of a list of descriptive links that appear on the Web page that includes the news article that the user is reading. For another example, consider a retail site for which prior art clustering techniques have been applied to establish clusters of users, based on such criteria as purchasing history and known or inferred demographic properties. Suppose that in addition to product recommendations based on a user's viewing history and purchasing history, it's desirable to display product recommendations based on the purchasing histories of users who have bought products that are similar to the product that the user is currently viewing. Then a first search expression may be generated from the description of the product that the user is currently viewing, and this search expression may be applied to product descriptions within purchasing histories of users within user clusters. The user clusters that score highest in this first search may then be used to generate a second search expression, where the second search expression reflects product descriptions within purchasing histories within user clusters, respecting nesting within product descriptions, nesting among user clusters, and possibly nested structures within individual purchasing histories. Products whose descriptions score highest in this second search may then be presented to the user together with product recommendations based on the user's purchasing history and viewing history, including the current product in the viewing history. It may be emphasized that these examples serve only to illustrate iterative generate-and-search.

XI. Computing Device Architecture

Figure 3:
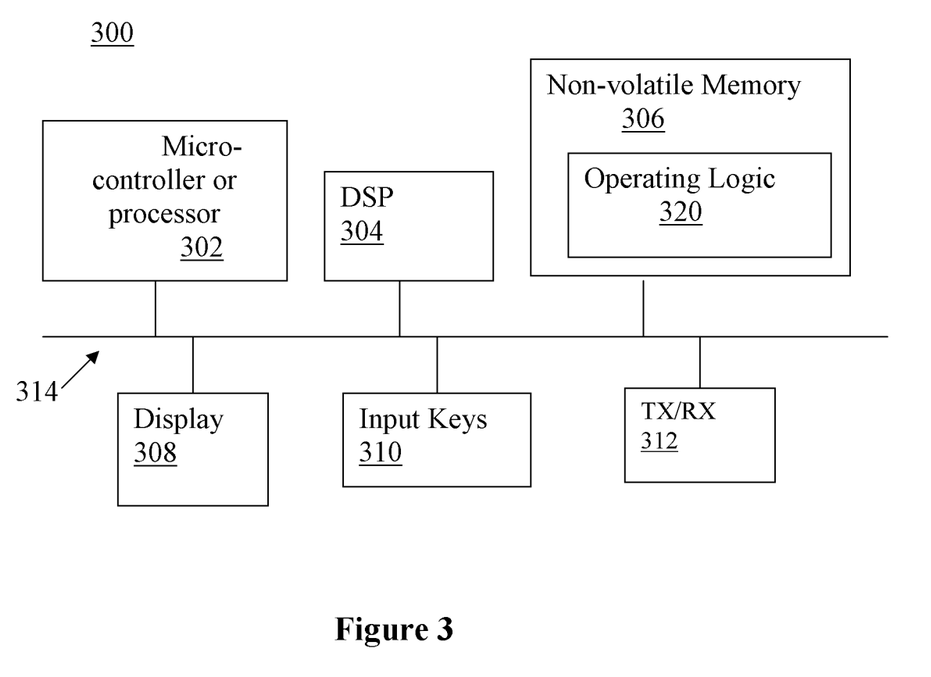
FIG. 3 illustrates an example computing environment suitable for practicing embodiments of the present disclosure.

FIG. 3 illustrates an architecture view of a computing device 300, such as a server, a desktop computer, a tablet or a PDA, suitable for practicing methods of the present disclosure, in accordance with various embodiments. Computing device 300 may be a server or a client. Whether as a server or client, computing device 300 may be coupled to clients or server via a wireless or wireline based interconnection, over one or more private and/or public networks, including the famous public network "Internet".

As illustrated, for the embodiment, computing device 300 may includes elements found in conventional computing device, such as (single or multi-core) micro-controller/processor 302, digital signal processor (DSP) 304, non-transitory storage medium such as non-volatile memory 306, display 308, input keys 310 (such as 12 key pad, select button, D-unit), and transmit/receive (TX/RX) 312, coupled to each other via bus 314, which may be a single bus or an hierarchy of bridged buses. Further, non-volatile memory 306 includes operating logic 320 adapted to implement the earlier described components, search expression generator, search engine, analyzer, configurator, and so forth, to practice the earlier described methods or some of the operations. The implementation may be via any one of a number programming languages, assembly, C, and so forth.

Except for their support of the practice of the methods of the present disclosure, the functions and constitutions of the various enumerated elements of FIG. 3 are known in the art, accordingly will not be otherwise further described either.

In alternate embodiments, all or portions of the end user interface may be implemented in hardware, firmware, or combination thereof. Hardware implementations may be in the form of application specific integrated circuit (ASIC), reconfigured reconfigurable circuits (such as Field Programming Field Array (FPGA)), and so forth.

What is claimed:

1. A computer-implemented method for assisting a user of a content item, comprising:
   receiving, by a search expression generator operated by a computer system, the content item, wherein the content item is a selected one of a web page, a post to a social networking site, a post to a blog, a post to an online bulletin board, a document, or an electronic message, having text divisible into a plurality of subtexts; and
   generating a search expression, by the search expression generator, based on the content item, to search other content items, through execution of the search expression, wherein the search expression is to include a hierarchy of a plurality of nested juxtaposition sub-expressions corresponding with nesting of subtexts of the content item;
   wherein the search expression is to be applied by a search engine operated on the same or a different computer system, to the other content items to generate a search result;
   wherein generating comprises recursively dividing the text of the content item into the subtexts, and transforming the subtexts into the search sub-expressions; and
   wherein the content item is a first content item, and the search result includes a second content item to be recommended to the user.

2. The computer-implemented method of claim 1, wherein the search expression further comprises a plurality of search expression terminals, a plurality of juxtaposition operators, and a plurality of parenthesizations, wherein generating includes iteratively and incrementally including the search expression terminals, the juxtaposition operators and the parenthesizations into the search expression to form the hierarchy of nested sub-expressions that are selectively associated by the juxtaposition operators, and wherein the parenthesizations denote order of application of the juxtaposition operators.

3. The computer-implemented method of claim 1, wherein transforming the subtexts into the search sub-expressions comprises transforming subtexts from sequences of words to sequences of classes, or to sequences of patterns.

4. The computer-implemented method of claim 1, wherein generating further comprises deleting various words from the content item prior to or during the recursive division.

5. The computer-implemented method of claim 1, wherein generating further includes inserting instances of a juxtaposition operator between sequence elements, and between sibling parenthesized expressions within the parenthesization hierarchy, during the recursive division.

6. The method of claim 1, wherein the search expression is a first search expression; the other content items are first other content items; the user also uses a second content item, and the method further comprises:
receiving, by the search expression generator, a constituent of the second content item, wherein the second content item is also a selected one of a web page, a post to a social networking site, a post to a blog, a post to an online bulletin board, a document, an electronic message, a product description, an entertainment description, or an advertisement, having text divisible into a plurality of subtexts; and generating a second search expression, by the search expression generator, based on the constituent of the second content item, to search second other content items, through execution of the second search expression, wherein the second search expression includes a hierarchy of a plurality of nested juxtaposition sub-expressions corresponds with nesting of subtexts of the constituent of the second content item;
wherein the second search expression is to be applied by the search engine operated on the same or a different computer system, to the second other content items to generate a second search result.

7. The method of claim 6, wherein the search result includes a constituent of a third content item or a fourth content item, to be recommended to the user.

8. The method of claim 6, wherein the user also uses a collection of content items, and the method further comprises:
receiving, by the search expression generator, the collection of content items, wherein the collection of content items comprises one or more web pages, posts to one or more social networking sites, posts to one or more blogs, posts to one or more online bulletin boards, documents, electronic messages, product descriptions, entertainment descriptions, advertisements, with each content item of the collection of content items having text divisible into a plurality of subtexts; and
generating a third search expression, by the search expression generator, based on the collection of content items, to search second other collections of content items, through execution of the third search expression, wherein the third search expression includes a hierarchy of a plurality of nested juxtaposition sub-expressions corresponding with nesting of subtexts within content items of the collection of content items;
wherein the third search expression is to be applied by the search engine operated on the same or a different computer system, to the second other collections of content items to generate a third search result.

9. The method of claim 8, wherein the collection of content items is a first collection of content items, and the third search result includes a second collection of content items, a second constituent of a third content item or a fourth content item, to be recommended to the user.

10. The method of claim 8, wherein generating the first, second or third search expression further comprises filtering terms according to at least criteria based on term frequency within the first content item, the constituent of the second content item, or the collection of content items, or according to criteria based on term frequency within the first, second or third other content items.

11. The method of claim 10, wherein filtering terms further comprises filtering the terms based at least in part on counts of documents containing the terms within the first, second or third other content items.

12. The method of claim 11, wherein filtering terms is further sensitive to position of content containing terms within content hierarchies, where a term being filtered appears in the first content item, the constituent of the second content item, the collection of content items, or in a content item within the first, second or third other content items.

13. The method of claim 8, wherein generating the first, second or third search expression further comprises assigning weights to sub-expressions of the first, second or third search expression, based at least in part on user inputs or user-related data.

14. The method of claim 8, wherein generating the first, second or third search expression further comprises moving or copying sub-expressions within the first, second or third search expression, based at least in part on user inputs or user-related data.

15. The method of claim 8 further comprises generating a fourth search expression based at least in part on the first, second or third search results.

16. An apparatus for consuming a content item, comprising:
one or more hardware processors and memory; and
a search expression generator to be operated by the one or more processors to:
receive the content item, wherein the content item is a selected one of a web page, a post to a social networking site, a post to a blog, a post to an online bulletin board, a document, or an electronic message, having text divisible into a plurality of subtexts; and
generate a search expression based on the content item, to search other content items, through execution of the search expression, wherein the search expression includes a hierarchy of a plurality of nested juxtaposition sub-expressions corresponding with nesting of subtexts of the content item;
wherein the search expression is to be applied by a search engine operated on the same or a different apparatus, to the other content items to generate a search result;
wherein generate comprises recursively dividing the text of the content item into the subtexts, and transform the subtexts into the search sub-expressions; and
wherein the content item is a first content item, and the search result includes a second content item to be recommended to a user.

17. The apparatus of claim 16, wherein the search expression is a first search expression; the other content items are first other content items; the user also uses a second content item, and the search expression generator is to further:
receive a constituent of the second content item, wherein the second content item is also a selected one of a web page, a post to a social networking site, a post to a blog, a post to an online bulletin board, a document, an electronic message, a product description, an entertainment description, or an advertisement, having text divisible into a plurality of subtexts; and
generate a second search expression based on the constituent of the second content item, to search second other content items, through execution of the second search expression, wherein the second search expression includes a hierarchy of a plurality of nested juxtaposition sub-expressions corresponding with nesting of subtexts of the constituent of the second content item;

wherein the second search expression is to be applied by the search engine operated on the same or a different apparatus, to the second other content items to generate a second search result.

18. The apparatus of claim 17, wherein the user also consumes a collection of content items, and the search expression generator is to further:
  receive the collection of content items, wherein the collection of content items comprises one or more web pages, posts to one or more social networking sites, posts to one or more blogs, posts to one or more online bulletin boards, documents, electronic messages, product descriptions, entertainment descriptions, advertisements, with each content item of the collection of content items having text divisible into a plurality of subtexts; and
  generate a third search expression based on the collection of content items, to search second other collections of content items, through execution of the third search expression, wherein the third search expression includes a hierarchy of a plurality of nested juxtaposition sub-expressions corresponding with nesting of subtexts within content items of the collection of content items;
  wherein the third search expression is to be applied by the search engine operated on a same or different computer system, to the second other collections of content items to generate a third search result.

19. One or more non-transitory computer-readable storage medium comprising a plurality of instructions to cause an apparatus, in response to execution of the instructions by one or more processors of the apparatus to implement a search expression generator for the apparatus, to:
  receive a content item, wherein the content item is a selected one of a web page, a post to a social networking site, a post to a blog, a post to an online bulletin board, a document, or an electronic message, having text divisible into a plurality of subtexts; and
  generate a search expression based on the content item, to search other content items, through execution of the search expression, wherein the search expression includes a hierarchy of a plurality of nested juxtaposition sub-expressions corresponding with nesting of subtexts of the content item;
  wherein the search expression is to be applied by a search engine operated on the same or a different apparatus, to the other content items to generate a search result;
  wherein generate comprises recursively dividing the text of the content item into the subtexts, and transform the subtexts into the search sub-expressions; and
  wherein the content item is a first content item, and the search result includes a second content item to be recommended to a user.

20. The computer-readable storage medium of claim 19, wherein the search expression is a first search expression; the other content items are first other content items; the user also uses a second content item, and the search expression generator is to further:
  receive a constituent of the second content item, wherein the second content item is also a selected one of a web page, a post to a social networking site, a post to a blog, a post to an online bulletin board, a document, an electronic message, a product description, an entertainment description, or an advertisement, having text divisible into a plurality of subtexts; and
  generate a second search expression based on the constituent of the second content item, to search second other content items, through execution of the second search expression, wherein the second search expression includes a hierarchy of a plurality of nested juxtaposition sub-expressions corresponding with nesting of subtexts of the constituent of the second content item;
  wherein the second search expression is to be applied by the search engine operated on the same or a different apparatus, to the second other content items to generate a second search result.

21. The computer-readable storage medium of claim 20, wherein the user also consumes a collection of content items, and the search expression generator is to further:
  receive the collection of content items, wherein the collection of content items comprises one or more web pages, posts to one or more social networking sites, posts to one or more blogs, posts to one or more online bulletin boards, documents, electronic messages, product descriptions, entertainment descriptions, advertisements, with each content item of the collection of content items having text divisible into a plurality of subtexts; and
  generate a third search expression based on the collection of content items, to search second other collections of content items, through execution of the third search expression, wherein the third search expression includes a hierarchy of a plurality of nested juxtaposition sub-expressions corresponding with nesting of subtexts within content items of the collection of content items;
  wherein the third search expression is to be applied by the search engine operated on a same or different computer system, to the second other collections of content items to generate a third search result.

* * * * *